United States Patent [19]

Lee

[11] Patent Number: 5,408,283
[45] Date of Patent: Apr. 18, 1995

[54] PROJECTION TYPE TELEVISION HAVING A MOVABLE REFLECTIVE MIRROR

[75] Inventor: Yong-hoon Lee, Seoul, Rep. of Korea

[73] Assignee: Samsung Electronics Co., Ltd., Kyungki, Rep. of Korea

[21] Appl. No.: 147,281

[22] Filed: Nov. 5, 1993

[30] Foreign Application Priority Data

Jan. 29, 1993 [KR] Rep. of Korea ............... 93-1087

[51] Int. Cl.⁶ .............................................. G03B 21/28
[52] U.S. Cl. ...................................... 353/77; 353/119; 348/789
[58] Field of Search ............... 353/74, 75, 76, 77, 353/78, 79, 98, 99, 119, 72, 71; 358/231, 237, 254, 60; 359/460, 456, 449; 348/789, 794, 836, 839

[56] References Cited

U.S. PATENT DOCUMENTS

| | | | |
|---|---|---|---|
| 3,864,032 | 2/1975 | Yanagawa | 353/76 |
| 4,572,632 | 2/1986 | Bodier et al. | 353/71 |
| 4,647,166 | 3/1987 | Franken et al. | 353/79 |
| 4,707,746 | 11/1987 | Nishikawa . | |
| 4,846,570 | 7/1989 | Kanai | 353/98 |
| 5,223,869 | 6/1993 | Yanagi | 353/78 |
| 5,283,602 | 2/1994 | Kwon | 353/37 |

Primary Examiner—William A. Cuchlinski, Jr.
Assistant Examiner—William C. Dowling
Attorney, Agent, or Firm—Lowe, Price, LeBlanc & Becker

[57] ABSTRACT

A projection-type television having a movable reflective mirror provides a simple structure having a pleasing external appearance. A reflective mirror for reflecting images is movably installed on a guider so as to be moved back and forth by the guider in a perpendicular direction with respect to a screen on which the images are displayed.

1 Claim, 4 Drawing Sheets

PROJECTION TYPE TELEVISION HAVING A MOVABLE REFLECTIVE MIRROR

BACKGROUND OF THE INVENTION

The present invention relates to a projection-type television, and more particularly to a projection-type television having a movable reflective mirror between a screen and a projection tube for projecting images.

In accordance with the coming of the information age, together with the appearance of various information transferring media, the size of image display devices needs to be increased. However, a conventional cathode ray tube (CRT) does not meet such requirements.

In other words, since current technology is limited in fabrication of large-scale conventional CRTs, the images from a small-sized CRT or a liquid crystal light valve, etc. are enlarged using an optical lens, to obtain a large-scale picture.

Projection methods are classified into a front projection method whereby enlarged images are projected on the front surface of a screen, and a rear projection method in which the enlarged images are projected onto the rear surface of a transmission-type screen. In view of image brightness, the rear projection method is much more advantageous.

In the case of a rear projection method as shown in FIG. 1, a necessary overall focus distance should be ensured to get a large-scale picture screen which has been determined in view of the optical design. Also, the depth of a cabinet 20 is designed while taking external aesthetics into consideration, and thus a method of redirecting an optical axis using a reflective mirror 21 is adopted.

With respect to the product's outward appearance, generally, only a portion of reflective mirror 21 protrudes outwardly, so that the depth of the product seems shallow. In this case, as the actual depth of the product does not change, the necessary packing volume remains unchanged. Nevertheless, the product is difficult to pack due to the protruding reflective mirror.

To overcome such drawbacks, the screen and the reflective mirror may be connected with a plurality of hinged crank rods which can be operated so as to move a screen and mirror assembly inside the cabinet. This is disclosed in U.S. Pat. No. 4,647,166. However, such a structure is complicated and, when the screen is in the operational position, the portion thereof which protrudes forwardly lends to an ungainly product appearance.

SUMMARY OF THE INVENTION

Therefore, to solve the above problems, it is an object of the present invention to provide a projection-type television having a movable reflective mirror and a pleasing outward appearance.

To accomplish the above object of the present invention, there is provided a projection-type television comprising: a projection tube for projecting images; a projection lens group having at least one projection lens for enlarging the images; a reflective mirror for reflecting the projected images; a screen on which the images are displayed; and guide means for moving the reflective mirror back and forth perpendicularly with respect to the screen.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

Figure 1:
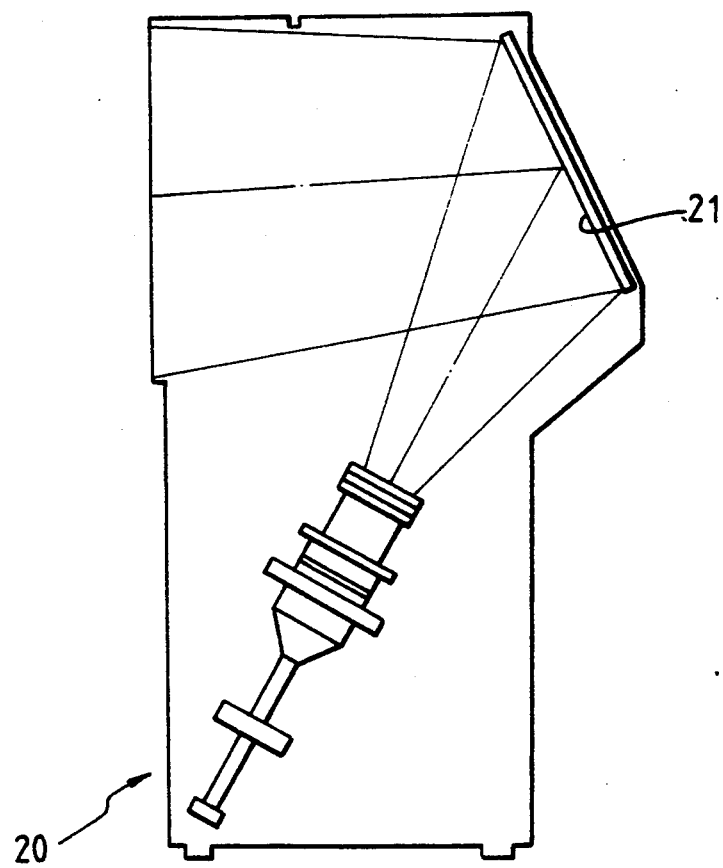
FIG. 1 is a cross-sectional view of the conventional projection-type television.
Figure 2:
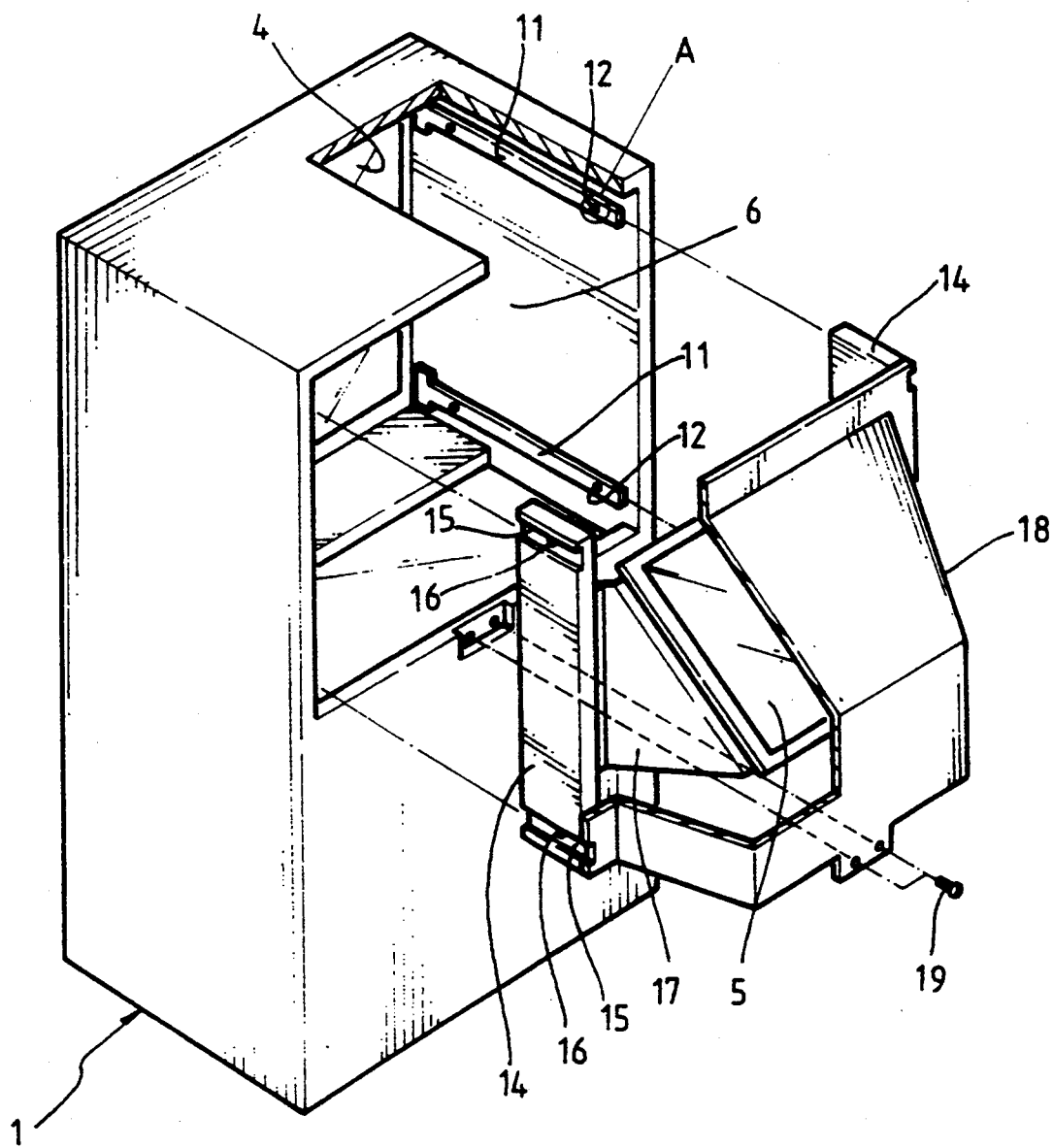
FIG. 2 is a partially exploded perspective view of a projection-type television according to the present invention.
Figure 4:
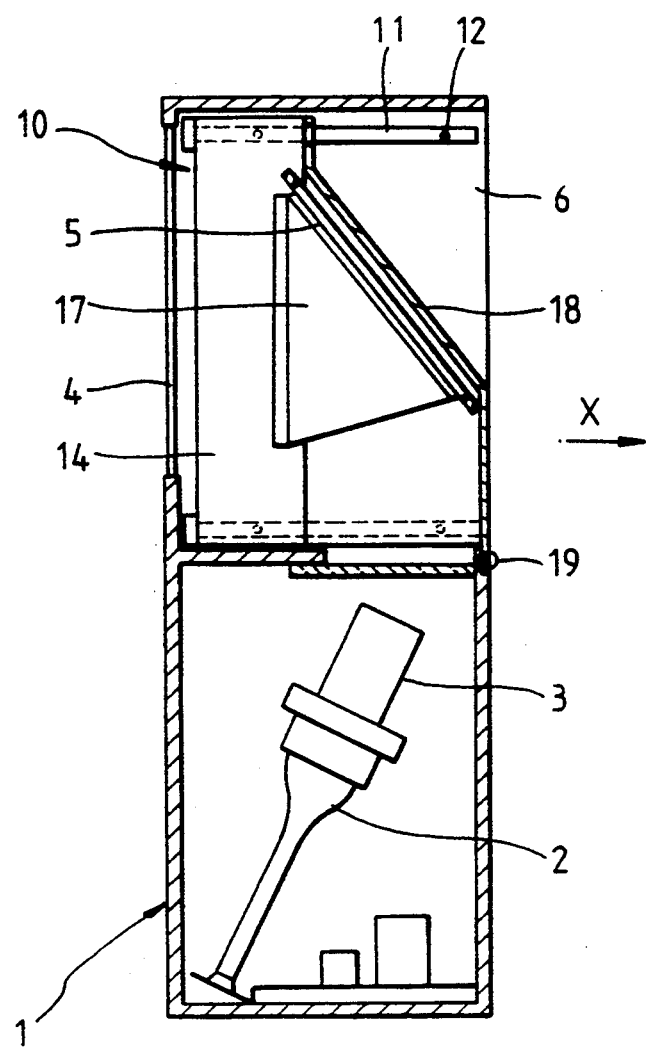
FIG. 4 is a cross-sectional view showing the non-operational state of the projection-type television according to the present invention.

A preferred embodiment of the present invention will be described hereinbelow in more detail, with reference to the accompanying drawings. As shown in FIGS. 2 and 4, in a projection-type television having a movable reflective mirror according to the present invention, a projection tube 2 for projecting images and a projection lens group 3 having at least one lens for enlarging images are installed along the same axis in the lower portion of a cabinet 1. In front of the upper portion of cabinet 1 is installed a screen 4 on which the images are displayed.

At a position opposite to screen 4 in cabinet 1 is installed a reflective mirror 5 for reflecting the projected images so as to be moved by a guider 10, back and forth in a perpendicular direction with respect to screen 4. On the upper portion of the rear surface of cabinet 1 is formed an opening 6, so that reflective mirror 5 can be protruded via a rear opening of cabinet 1.

The guider 10 is provided with two pairs of guide rails 11 of which one pair thereof is installed on either side of the inner surface of cabinet 1.

A pair of moving plates 14 in which guide grooves 15 being connected with guide rails 11 are formed on the lower and upper portions. Here, the moving plates 14 are integrally connected with a fixing bracket 17 on which reflective mirror 5 is fixedly installed.

Figure 3:
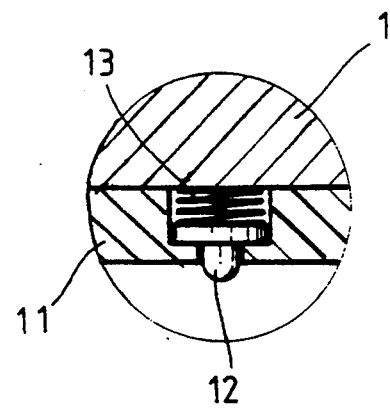
FIG. 3 is an enlarged cross-sectional view of a portion "A" in FIG. 2.

As shown in FIG. 3, guide rail 11 can restrict the movement of moving plate 14. That is, a position-determining pin 12 is elastically installed in guide rail 11 by a spring 13, to stop reflective mirror 5 at a focus distance for obtaining an optically determined large-scale picture screen. In guide groove 15 of moving plate 14 is formed a groove 16 into which position-determining pin 12 is inserted.

Also, on moving plate 14 is installed a cover 18 for protecting reflective mirror 5. On this cover 18 are installed fastening screws 19 for fixedly installing cover 18 on cabinet 1.

The projection-type television having a movable reflective mirror according to the present invention which has the above-described constitution operates as follows.

Figure 5:
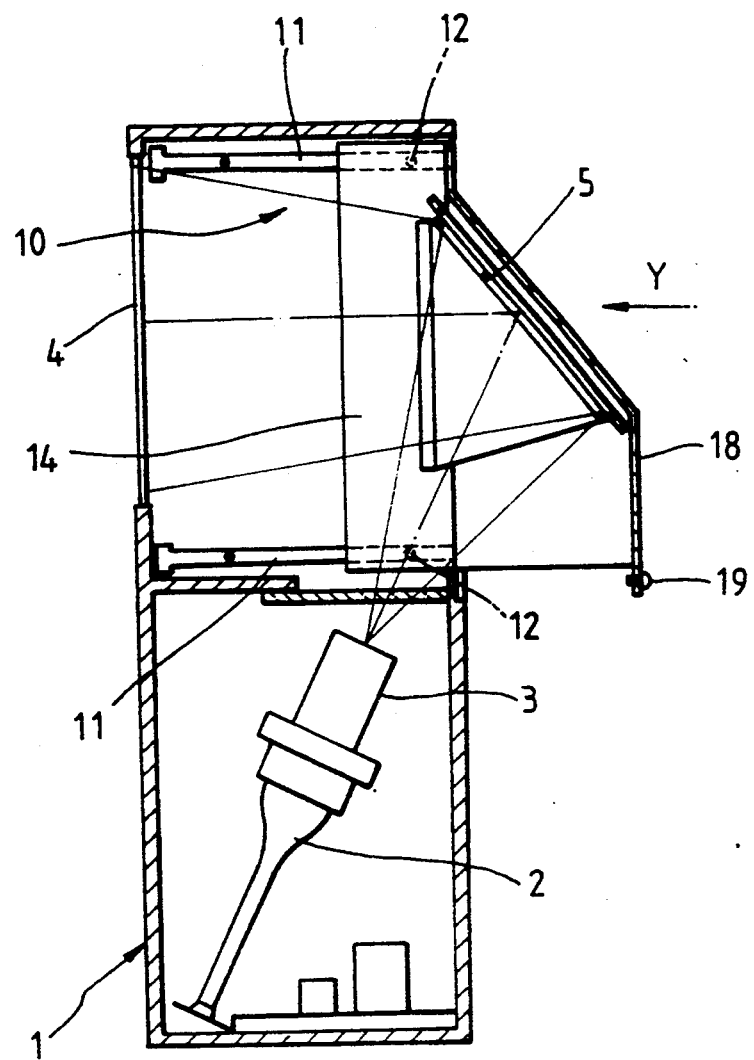
FIG. 5 is a cross-sectional view showing the operational state of the projection-type television according to the present invention.

As shown in FIG. 4, if cover 18 is pulled in the direction of an arrow "X" from the non-operational state in which reflective mirror 5 rests inside cabinet 1, moving plate 14 travels along guide rail 11. Accordingly, reflective mirror 5 which is fixedly installed on moving plate 14 by fixing bracket 17 becomes protruded out of cabinet I through an opening 16 formed in cabinet 1. Here, when reflective mirror 5 is protruded out of cabinet 1, groove 16 formed on moving plate 14 is connected with position-determining pin 12 which is installed in guide rail 11. Accordingly, as shown in FIG. 5, reflective mirror 5 stops upon reaching a proper focus distance for obtaining an optically determined large-scale picture.

In this state images generated from projection tube 2 are enlarged by projection lens 3. The enlarged images are then reflected by reflective mirror 5 and projected onto screen 4.

During storage or transportation of the projection-type television according to the present invention, if cover 18 is pushed in the direction of an arrow "Y" frown the state in which reflective mirror 5 is protruded out of cabinet 1 (FIG. 5), moving plate 14 retreats along guide rail 11. Accordingly, reflective mirror 5 is moved back into cabinet 1 (FIG. 4).

Also, in the non-operational state, cover 18 is fixed on cabinet 1 using fastening screws 19 installed on cover.

As described above, referring to the projection-type television having the movable reflective mirror according to the present invention, since the reflective mirror moves back and forth in a perpendicular direction with respect to the screen by the guide rails and the moving plates as a guide means, its structure is simple in comparison with the convention method in which the screen and the reflective mirror are rotatably connected with a plurality of hinged crank rods. Accordingly, the present invention can save production costs. Also, since the reflective mirror is protruded through a rear opening of the cabinet during operation, the external appearance of the product is improved over a conventional method in which the screen and the reflective mirror protrude from a front surface of the cabinet.

What is claimed is:

1. A projection-type television comprising:
    a projection tube for projecting images;
    a projection lens group having at least one projection lens for enlarging images;
    a reflective mirror for reflecting the projected images;
    a screen on which the images are displayed;
    guide means for moving said reflective mirror perpendicularly with respect to the screen; wherein
    said guide means includes guide rails, and moving plates which are moved along said guide rails and on which said reflective mirror is fixedly installed; and wherein
    a position-determining pin is elastically installed via a spring on either of said guide rails to stop the reflective mirror at a predetermined focus distance from the screen, and a groove is installed on either of said moving plates, by which said position-determining pin is connected.

* * * * *